US006323286B1

(12) United States Patent
Kuramochi et al.

(10) Patent No.: US 6,323,286 B1
(45) Date of Patent: Nov. 27, 2001

(54) POLYPROPYLENE COMPOSITION

(75) Inventors: Hitoshi Kuramochi; Osamu Kojima; Yoshitaka Sumi; Takanori Nakashima; Shinichi Akitaya, all of Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/529,547

(22) PCT Filed: Aug. 13, 1999

(86) PCT No.: PCT/JP99/04397

§ 371 Date: Apr. 14, 2000

§ 102(e) Date: Apr. 14, 2000

(87) PCT Pub. No.: WO00/11081

PCT Pub. Date: Mar. 2, 2000

(30) Foreign Application Priority Data

Aug. 18, 1998 (JP) .................................................. 10-231655

(51) Int. Cl.$^7$ ........................ C08F 293/00; C08F 255/02
(52) U.S. Cl. ........................... 525/323; 525/322; 525/89; 525/240; 525/242
(58) Field of Search .................................. 525/323, 322, 525/89, 240, 242

(56) References Cited

U.S. PATENT DOCUMENTS 5,998,524 * 12/1999 Srinivasan et al. .................. 525/240

FOREIGN PATENT DOCUMENTS

| 61-14248 | 1/1986 | (JP) . |
|---|---|---|
| 3-119003 | 5/1991 | (JP) . |
| 4-103604 | 4/1992 | (JP) . |
| 6-93061 | 4/1994 | (JP) . |
| 7-30145 | 4/1995 | (JP) . |
| 8-27238 | 1/1996 | (JP) . |
| 8-208941 | 8/1996 | (JP) . |
| 9-216975 | 8/1997 | (JP) . |
| 10-316810 | 12/1998 | (JP) . |
| 97/19135 | 5/1997 | (WO) . |

* cited by examiner

Primary Examiner—James J. Seidleck
Assistant Examiner—Olga Asinovsky
(74) Attorney, Agent, or Firm—McDermott, Will & Emery

(57) ABSTRACT

The composition of the present invention is not costly, excellent in an emboss transferring property, and is applicable for various skin materials and interior materials.

The present invention provides a polypropylene composition which comprises a propylene block copolymer component containing a crystalline polypropylene segment and a propylene/α-olefin copolymer segment, and a synthetic olefin rubber component and/or a synthetic styrene rubber component, wherein the copolymer segment has an intrinsic viscosity $[\eta]_{RC}$ of 6.5 dl/g or less, and an intrinsic viscosity ratio $[\eta]_{RC}/[\eta]_{PP}$ of the copolymer to the crystalline polypropylene segment is 0.5 to 1.3; and a product of this intrinsic viscosity ratio $[\eta]_{RC}/[\eta]_{PP}$ and a weight ratio thereof $W_{PP}/W_{RC}$, ($[\eta]_{RC}/[\eta]_{PP}$)×($W_{PP}/W_{RC}$), falls in the range of 0.2–4.5; and a ratio of a melt flow rate of the rubber component to a melt flow rate of the crystalline polypropylene segment, $[MFR]_{TR}/[MFR]_{PP}$, is 0.3–80.

7 Claims, 1 Drawing Sheet

F I G. 1
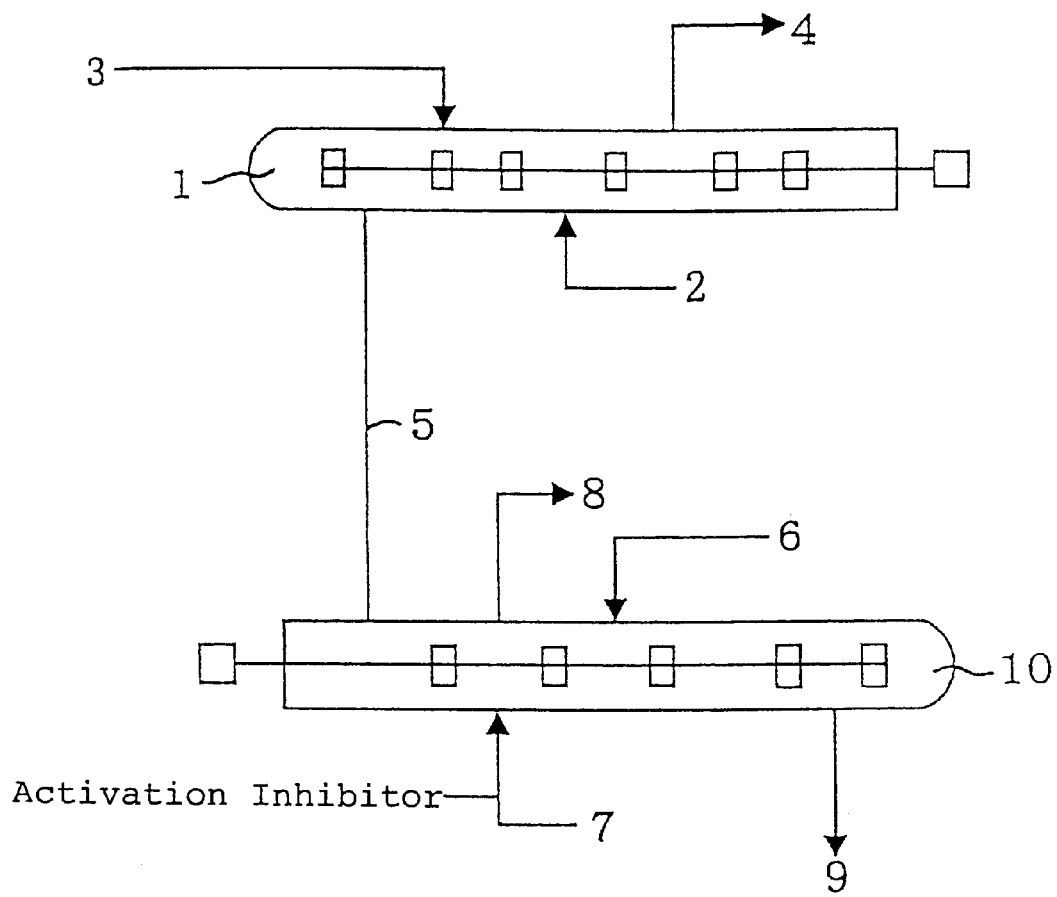

POLYPROPYLENE COMPOSITION

TECHNICAL FIELD

The present invention relates to a polypropylene composition. More specifically, the invention relates to a polypropylene composition which contains a specific propylene block copolymer and rubber, and which has a flexibility like soft vinyl chloride resins, semi-rigid vinyl chloride resins and/or olefin thermoplastic elastomers and is excellent in an emboss transferring property.

BACKGROUND ART

Polypropylene resins are used in various fields due to the excellent characteristics and inexpensiveness. Propylene homopolymers generally have a high rigidity, but are inferior in impact resistance, particularly at low temperatures.

A propylene block copolymer having improved low temperature impact resistance of a homopolymer is known. The copolymer is prepared by incorporating a first formed component propylene homopolymer segment and a second formed component ethylene/propylene random copolymer segment. This block copolymer is widely used in industrial fields including automobiles and home appliances.

Such block copolymers are excellent in impact resistance, but are inferior in transparency and gloss as compared with a homopolymer. Further, the copolymers have a high mold shrinkage factor as is the case with the homopolymer. In order to improve this, inorganic fillers such as talc are used or an ethylene content in the random copolymer segment is reduced. The former, however, brings about a weight increase and poor appearance of the molded article due to the addition of a large amount of inorganic substance. The latter reduces the rigidity as well as the impact resistance at low temperatures, though the transparency and gloss are elevated.

With these problems, JP-B-7-30145 discloses a propylene block copolymer comprising a crystalline polypropylene segment and an ethylene/propylene random copolymer block segment, wherein the crystalline polypropylene content is 55–95% by weight; an intrinsic viscosity ratio of both the segments $[\eta]_{EP}/[\eta]_{PP}$ is 0.5–2.0; and the ethylene/propylene random copolymer block segment has a glass transition temperature of −30° C. or lower. Further, JP-A-6-93061 discloses a propylene block copolymer obtained by molten-kneading a block copolymer which is prepared by polymerizing firstly 60–80% by weight, based on the whole polymerized amount, of a polymer mainly composed of propylene, and then an ethylene/propylene copolymer segment having an ethylene content of 20–50% by weight. In the block copolymer, the ethylene/propylene copolymer segment has an intrinsic viscosity $[\eta]_B$ of 2.0 dl/g or more, and an intrinsic viscosity ratio of both segments $[\eta]_B/[\eta]_A$ is 1.8 or less.

However, such propylene block copolymers have the ethylene/propylene copolymer segment contents and an intrinsic viscosity ratio which are controlled almost in the same ranges. The former case has improved mechanical characteristics such as impact resistance and rigidity, but is still unsatisfactory in the transparency, gloss and appearance. On the other hand, the latter has improved impact resistance at low temperatures, blocking resistance and appearance, but is still unsatisfactory in the rigidity. Molding shrinkage factor is also not satisfactory in both cases.

The present inventors have proposed propylene block copolymers which are excellent in and well balanced of transparency, gloss, molding shrinkage factor and rigidity, in JP-A-8-27238, WO97/19135 and Japanese Patent Application No. 132176/1997.

On the other hand, soft or semi-rigid polyvinyl chloride has widely been used as exterior or interior materials for automobiles and home appliances due to the easiness in processability. However, they may produce dioxin upon incineration, and thus recently, various alternates have been investigated. Typically used are olefin resins such as olefin thermoplastic elastomers.

While the propylene block copolymers proposed by the present inventors have excellent and well balanced characteristics as mentioned above, they are not fully satisfactory particularly when used for exterior or interior materials and are therefore still a matter for improvement.

On the other hand, the thermoplastic elastomers described above are not only costly, but also have poor flowability on molding, so that the resulting molded articles (exterior and interior parts) often have an unsatisfactory appearance. In particular, they are inferior in the emboss transferring property from a mold and an embossing roll and are apt to damage the high quality impression of the final home appliances and automobiles.

The present invention has been made based on these problems in the conventional techniques, aiming to provide a polypropylene composition which is of low cost and excellent in the emboss transferring property and useful for various exterior and interior materials.

In order to achieve the above object, the present inventors have intensively studied and found that blending a specific propylene block copolymer component with a rubber component and controlling the melt flow rate (hereinafter abbreviated to "MFR"), if necessary, can achieve the object.

DISCLOSURE OF THE INVENTION

The present invention is composed of the following:

1) A polypropylene composition having an excellent emboss transferring property, which comprises a propylene block copolymer component containing crystalline polypropylene segment and a propylene/α-olefin copolymer segment, and a synthetic olefin rubber component and/or a synthetic styrene rubber component, wherein the copolymer segment in the block copolymer component has an intrinsic viscosity $[\eta]_{RC}$ up to 6.5 dl/g, and the block copolymer has an intrinsic viscosity ratio of the copolymer segment to the crystalline polypropylene segment $[\eta]_{RC}/[\eta]_{PP}$ of 0.5–1.3; and a product $[\eta]_{RC}/[\eta]_{PP} \times (W_{PP}/W_{RC})$ of the intrinsic viscosity ratio ($[\eta]_{RC}/[\eta]_{PP}$) and the weight ratio $W_{PP}/W_{RC}$ in the range of 0.2–4.5; and a ratio of a melt flow rate (230° C., 21.18N) of the rubber component to a melt flow rate (230° C., 21.18N) of the crystalline polypropylene segment in the block copolymer component, $[MFR]_{TR}/[MFR]_{PP}$, being 0.3–80.

2) The polypropylene composition as described in the above item 1, wherein the olefin synthetic rubber component is at least one rubber selected from the group consisting of an ethylene/propylene copolymer rubber, an ethylene/propylene/diene terpolymer rubber, an ethylene/butene copolymer rubber, a hydrogenated butadiene block copolymer rubber and an ethylene/octene copolymer rubber.

3) The polypropylene composition as described in the above item 1 or 2, wherein the crystalline polypropylene segment of the propylene block copolymer component has a melt flow rate [MFR]pp of 0.1–50 g/10 minutes (230° C., 21.18N), and the rubber component has a melt flow rate [MFR]TR of 0.1–40 g/10 minutes (230° C., 21.18N).

4) The polypropylene composition as described in any of the above items 1–3, comprising 40–80% by weight of the propylene block copolymer component and 60–20% by weight of the rubber component.

5) The polypropylene composition as described in any of the above items 1 to 4, wherein the crystalline polypropylene segment of the propylene block copolymer component is a propylene homopolymer or a propylene/α-olefin random copolymer having a propylene content of 90–99% by weight based on the weight of the crystalline polypropylene segment.

6) The polypropylene composition as described in any of the above items 1 to 5, wherein a molecular weight-reducing agent of 0.001–0.2 part by weight per 100 parts by weight of the polypropylene composition is added.

7) The polypropylene composition as described in any of the above items 1 to 6, wherein the propylene/α-olefin random copolymer segment of the propylene block copolymer component contains an ethylene weight unit of 20–55% by weight based on the weight of the copolymer segment.

BRIEF DESCRIPTION OF THE DRAWINGS

FIG. 1 shows a flow sheet showing a continuous polymerization apparatus used in the examples.

BEST MODE FOR CARRYING OUT THE INVENTION

The polypropylene composition of the present invention shall be explained below in detail.

As described above, the polypropylene composition of the invention comprises a propylene block copolymer component and a rubber component. The block copolymer component contains a crystalline polypropylene segment of a propylene homopolymer or a propylene/α-olefin copolymer and a copolymer segment of propylene/α-olefin.

Highly crystalline (stereoregular) polypropylene having an isotactic pentad fraction P of 0.95 or more, particularly 0.955 or more, is preferably used here for the propylene homopolymer segment of the block copolymer component.

The isotactic pentad fraction P has an effect on the heat resistance of this propylene block copolymer component, in turn on the mechanical characteristics of the present composition such as heat resistance. The larger the value is, the higher the heat resistance is.

A propylene/α-olefin random copolymer having a propylene content of 90–99% by weight can be used as a crystalline polypropylene segment of the block copolymer component. The propylene content of less than 90% by weight may sometimes lower the heat resistance or adversely affect the mechanical characteristics.

On the other hand, an example of the propylene/α-olefin copolymer segment may be an ethylene/propylene copolymer. The ethylene/propylene copolymer segment can be an ethylene/propylene random copolymer containing 20–50% by weight, preferably 25–50% by weight, of an ethylene polymerization unit based on the whole copolymer.

The amount of the ethylene polymerization unit affects the rigidity and impact resistance of the block copolymer component, particularly the impact resistance at low temperatures. The larger amount can provide the better impact resistance. The amount exceeding 55% by weight affects the dispersibility of the copolymer into the crystalline polypropylene and sometimes reduces the mechanical characteristics of the present composition such as an emboss transferring property and tear strength. Therefore the amount of the ethylene polymerization unit should preferably be controlled in the range described above.

The above copolymer segment has an intrinsic viscosity $[\eta]_{RC}$ of 6.5 dl/g or less determined in tetralin at 135° C., and an intrinsic viscosity ratio of the copolymer segment to an intrinsic viscosity $[\eta]_{PP}$ of the crystalline polypropylene segment determined on the same condition, $[\eta]_{RC}/[\eta]_{PP}$, is 0.5–1.3.

The intrinsic viscosity $[\eta]_{RC}$ of the copolymer segment can not be determined directly. Therefore, it is calculated from the directly determinable intrinsic viscosity $[\eta]_{PP}$ of the crystalline polypropylene segment, the intrinsic viscosity $[\eta]_{WHOLE}$ of the whole propylene block copolymer component and the copolymer segment content $W_{RC}$ (% by weight), based on the following equation (1):

$$[\eta]_{RC} = \{[\eta]_{WHOLE} - (1 - W_{RC}/100)[\eta]_{PP}\}/(W_{RC}/100) \quad (1)$$

The intrinsic viscosity $[\eta]_{RC}$ of the copolymer segment affects the mechanical characteristics such as molding cycle property, film-forming property and flexibility of the present composition, while the intrinsic viscosity ratio $[\eta]_{RC}/[\eta]_{PP}$ affects the dispersibility of the copolymer segment and the rubber component into the crystalline polypropylene.

The larger intrinsic viscosity $[\eta]_{RC}$ enhances the mechanical characteristics, but it also brings about higher rigidity of the propylene block copolymer component, damaging the flexibility of the present composition. On the other hand, an excessively large or small intrinsic viscosity ratio $[\eta]_{RC}/[\eta]_{PP}$ provides insufficient impact resistance at low temperatures. An excessively large ratio may provide less improvement in the mold shrinkage factor, and therefore the intrinsic viscosity $[\eta]_{RC}$ and the intrinsic viscosity ratio $[\eta]_{RC}/[\eta]_{PP}$ should be controlled in the ranges described above.

The weight ratio of the crystalline polypropylene segment to the copolymer segment, $W_{PP}/W_{RC}$, in the present composition takes such a value that allows the product of the said ratio and the intrinsic viscosity ratio of both segments $(([\eta]_{RC}/[\eta]_{PP}) \times (W_{PP}/W_{RC}))$ to lie in the range of 0.2–4.5.

This product of the weight ratio and the intrinsic viscosity ratio of both polymer segments is an index for the molding shrinkage of the block copolymer component, and hence that of the present composition. The smaller value denotes any improvement in the mold shrinkage factor, while it denotes reduction in the heat resistance and the rigidity. On the other hand, if it is too large, the desired improvement in the mold shrinkage factor cannot be achieved.

Specifically, the composition of the block copolymer segment is 20–70% by weight, preferably 25–60% by weight, of the copolymer segment; and 80–30% by weight, preferably 75–40% by weight, of the crystalline polypropylene segment, each based on the whole copolymer component.

This copolymer component has preferably a narrow molecular weight distribution in which the Q value (Mw/Mn) is 5 or less, preferably 4.5 or less. Large molecular weight distribution with the Q value exceeding 5 is not preferable, because such may sometimes lower the gloss of the present composition.

The rubber component used for the composition of the present invention shall be explained below.

Such rubber component is not specifically restricted as long as it is a synthetic olefin rubber and/or a synthetic styrene rubber. In the present invention, the synthetic rubber means a synthesized product with elastomeric properties including elastic products such as a thermoplastic elastomer.

More specifically, the synthetic olefin rubber includes copolymer rubbers of ethylene with propylene such as an ethylene/propylene copolymer rubber (EPM) and an ethylene/propylene/diene terpolymer rubber (EPDM); copolymer rubbers of ethylene with higher α-olefin having about 4–10 carbon atoms, such as an ethylene/butene copolymer rubber (EMB), an ethylene/hexene copolymer rubber (EHM) and an ethylene/octene copolymer rubber (EOM); olefin elastomers such as block copolymers having olefin crystal-ethylene/butylene-olefin crystal, e.g., a hydrogenated butadiene block copolymer rubber; and any mixed rubbers thereof. In particular, ethylene copolymer rubbers are preferably used for the present composition.

Further, the synthetic styrene rubber used for the composition of the invention shall be explained. Such a styrene rubber is not specifically restricted as long as it is a synthetic styrene rubber. More specifically, the styrene rubber includes styrene thermoplastic elastomers, i.e., block copolymers having a polystyrene block and a rubber intermediate block, such as a styrene-butadiene-styrene, butadiene-styrene, a styrene-isoprene-styrene, a styrene-ethylene/butylene-styrene, a styrene-ethylene/propylene-styrene and a combined copolymer of polystyrene and vinyl-polyisoprene; styrene/butadiene rubbers; hydrogenated styrene/butadiene rubbers; styrene-ethylene/butylene-olefin crystal block copolymers; and any mixed rubbers thereof.

Preferred synthetic olefin rubbers and/or synthetic styrene rubbers are those having an MFR of 0.1–40 g/10 minutes (230° C., 21.18N).

As described later, the expected effect of the present invention are achieved by controlling a ratio of the MFR (230° C., 21.18N) of the crystalline polypropylene segment to the MFR (230° C., 21.18N) of the synthetic olefin rubber component and/or synthetic styrene rubber component. An MFR of 0.1 g/10 minutes or less for the synthetic olefin rubber component and/or synthetic styrene rubber component causes the MFR of the whole composition to be reduced, resulting in much poorer flowability, hence, reduced molding and film-forming properties. Also, an MFR exceeding 40 g/10 minutes is not desirable, because it causes sticking to a mold or an embossing roll and the reduction in the molding and film-forming properties as in the former case.

It is preferable for the present composition that the $[MFR]_{TR}/[MFR]_{PP}$ ratio, the ratio of the melt flow rate of the rubber component to [that of] the crystalline polypropylene segment in the propylene block copolymer component, be controlled and be in the range from 0.3–80, desirably 0.4–30.

An $[MFR]_{TR}/[MFR]_{PP}$ ratio out of the above ranges may make the emboss transferring property of the present composition inferior and therefore is not preferred.

More specifically, MFR (230° C., 21.18N) of the crystalline polypropylene segment in the block copolymer component is preferably set to 0.1–50 g/10 minutes, particularly 0.5–30 g/10 minutes, and MFR (230° C., 21.18N) of the rubber component is preferably set to 0.1–40 g/10 minutes, particularly 0.5–30 g/10 minutes. The ratio $[MFR]_{TR}/[MFR]_{PP}$ is controlled preferably within the range described above.

As described above, the composition of the present invention is a polypropylene composition comprising the propylene block copolymer component and the synthetic olefin rubber component and/or the synthetic styrene rubber component explained above. When the present composition is used as a molding material for injection or extrusion molding, embossing deviation and sink are less liable to occur, and the good emboss transferring property can be achieved, so that the molded article having an excellent appearance can be obtained.

Such molded articles, typically, sheets, films and injection-molded articles are utilized as various skin materials and interior and exterior materials for building materials, furnitures, home appliances and automobiles. For building materials, furnitures and home appliances, they are suitably used, for example, in decorative papers, wall papers and various covering materials. For automobiles, they are suitably used, for example, in instrument panels, door trims, seats, air bag covers, pillar trims, assist grips, and braids such as side braids, weather strips and window braids, as well as a mud guard. Faithfully reproduced mold cavity and surface shape of an embossing roll can serves to provide an upgraded quality impression of the home appliances and automobiles.

A blending ratio of the propylene block copolymer component to the rubber component in the present composition shall not specifically be limited as long as it achieves such an emboss transferring property and appearance as the present invention aims to provide. However, it is influenced by the MFR of the block copolymer component used and the kind and MFR of the rubber component used. Typically, it is 40–80% by weight of the block copolymer component to 60–20% by weight of the rubber component.

The process for producing the composition of the present invention is explained below.

First, the propylene block copolymer component as a component of the present composition may be produced by any methods as long as the intrinsic viscosities, the intrinsic viscosity ratio and the product of the viscosity ratio and the weight ratio described above can be achieved. It is produced preferably by carrying out polymerization for the crystalline polypropylene segment in a vapor phase, in the presence of a stereoregular catalyst containing a titanium-containing solid catalyst component (A) having a large particle diameter, an organic aluminum compound (B) and, if necessary, an organic silicon compound (C) (first polymerization step) and then copolymering a propylene and α-olefin (second polymerization step).

In this case, the titanium-containing solid catalyst component (A) of the stereoregular catalyst can be used without any carrier, but it may be carried on an inorganic carrier such as a magnesium compound, silica or alumina and an organic carrier such as polystyrene. Catalysts to which is added an electron-donating compound such as ethers and esters can be used also.

Specific examples thereof include a titanium-containing solid catalyst prepared by spraying an alcohol solution of a magnesium compound to obtain a solid component comprising an alcohol adduct of the magnesium compound, partially drying the solid component and then treating the dried solid component with halogenated titanium and an electron-donating compound (JP-A-3-119003); and a titanium-containing solid catalyst prepared by dissolving a magnesium compound in a solution of tetrahydrofuran/alcohol/electron-donating compound and then treating a magnesium compound precipitated with $TiCl_4$ alone or in combination with an electron donor, with halogenated titanium and an electron-donating compound (JP-A-4-103604).

The titanium-containing solid catalyst (A) having an average particle diameter of 25 to 300 μm, preferably 30 to 150 μm, is conveniently used.

The average particle diameter of less than 25 μm is not suitable, because it may cause serious damage to the flowability of the resulting block copolymer powders, which stick on a wall of a polymerization vessel and stirring blades, resulting in contamination of the polymerization system or difficult transportation of the powders discharged from the polymerization vessel, preventing the stable operation.

Further, the titanium-containing solid catalyst component (A) preferably has a uniformity of regular distribution of 2.0 or less. The uniformity exceeding 2.0 may reduce the flowability of powders in the resulting block copolymer, rendering continuous and stable operation difficult and therefore is not preferred.

A compound represented by the following formula is preferably used as an organic aluminum compound (B):

$$R^1_m AlX_{3-m}$$

wherein $R^1$ represents a hydrocarbon group having 1 to 20 carbon atoms; X represents a halogen atom; and m represents a positive number satisfying $3 \geq m \geq 1$.

Specific examples of such organic aluminum compound (B) include trimethylaluminum, triethylaluminum, tri-n-propylaluminum, tri-n-butylaluminum, tri-isobutylaluminum, dimethylaluminum chloride, methylaluminum chloride, methylaluminum sesquichloride, di-n-propylaluminum monochloride, ethylaluminum sesquichloride, ethylaluminum dichloride, methylaluminum iodide and ethoxymethylaluminum, and triethylaluminum are preferably used.

These organic aluminum compounds can be used alone or in a mixture of two or more thereof.

Preferred organic silicon compound (C) is a compound represented by the following formula:

$$R^2_x R^3_y Si(OR^4)_z$$

wherein $R^2$ and $R^4$ represent a hydrocarbon group; $R^3$ represents a hydrocarbon group or a hydrocarbon group containing a hetero atom; and X, Y and Z satisfy $0 \leq X \leq 2$, $1 \leq Y \leq 3$ and $1 \leq Z \leq 3$, respectively and $X+Y+Z=4$.

Specific examples of such organic silicon compound (C) include methyltrimethoxysilane, ethyltrimethoxysilane, n-propyltrimethoxysilane, phenylmethyldimethoxysilane, t-butyltrimethoxysilane, t-butyltriethoxysilane, phenyltriethoxysilane, methylethyldimethoxysilane, methylphenyldimethoxysilane, dimethyldimethoxysilane, dimethylmethoxysilane, diisopropyldimethoxysilane, diisobutyldimethoxysilane, di-t-butyldimethoxysilane, diphenyldimethoxysilane, trimethylmethoxysilane, cyclohexylmethyldimethoxysilane or trimethylethoxysilane, and any mixtures thereof. Preferably used are diisobutyldimethoxysilane, diisopropyldimethoxysilane, di-t-butyl-dimethoxysilane, cyclohexylmethyldimethoxysilane and diphenyldimethoxysilane.

In the production of the block copolymer component, the stereoregular catalyst prepared by blending the previously described titanium-containing solid catalyst (A), the organic aluminum compound (B) and, if necessary, the organic silicon compound (C), is used in the polymerization for the crystalline polypropylene (the first polymerization step). In this case, the catalyst component (A) is preferably used in a preactivated state by reacting with α-olefin beforehand.

The titanium-containing solid catalyst component (A) is preactivated with an organic aluminum compound (B'), which can be the organic aluminum compound (B) described above. The compound (B') may be either the same as or different from the organic aluminum compound (B) which is used in the subsequent polymerization. The compounds (B) and (B') are preferably of the same kind and triethylaluminum.

The amount of the organic aluminum compound(B') to be used in such preactivation treatment is not specifically restricted, and usually the compound (B') is used in terms of a proportion of 0.1–40 moles, preferably 0.3–20 moles per mole of a titanium atom contained in the titanium-containing solid catalyst component (A). Using such amount, 0.1–100 g, preferably 0.5–5μg of α-olefin per one gram of the catalyst (A) is reacted at 10–80° C. for 10 minutes to 48 hours to complete the preactivation treatment.

In the preactivation treatment, an organic silicon compound (C') can be used, if necessary, which can be the above described organic silicon compound (C). The compound (C') may be either the same as or different from the organic silicon compound (C) which is used in the subsequent polymerization, and is used in a proportion of 0.01–10 moles, preferably 0.05–5 moles per mole of the organic aluminum compound.

Suitable organic silicon compound (C') includes diisobutyldimethoxysilane, diisopropyldimethoxysilane, di-t-butyldimethoxysilane, cyclohexylmethyldimethoxysilane and diphenyldimethoxysilane.

Examples of the olefin used in the preactivation treatment include ethylene, propylene, 1-butene, 1-pentene, 1-hexene, 1-octene, 1-decene, 1-dodecene, 1-tetradecene, 1-hexadecene, 1-octadecene, 1-eicocene, 4-methyl-1-pentene or 3-methyl-1-pentene, and any mixtures thereof.

Further, in the polymerization thereof, a molecular weight modifier such as hydrogen can also be used to control the molecular weight of the polymer.

In the preactivation treatment, an inert solvent is used. The inert solvent includes such solvents that do not markedly influence the polymerization reaction, for example, liquid saturated hydrocarbons such as hexane, heptane, octane, decane, dodecane and liquid paraffin, or silicone oils having a structure of dimethylpolysiloxane. These solvents can be used alone or in combination of two or more thereof.

Such inert solvents should preferably be used after removing impurities such as moisture and sulfur-containing compounds that adversely affect the polymerization.

As described above, in the production of the block copolymer component of the polypropylene composition according to the present invention, the first step vapor phase polymerization of the crystalline polypropylene segment and the second step copolymerization of the propylene and α-olefin are carried out continuously in the presence of a stereoregular catalyst.

The first polymerization step is not restricted to vapor phase polymerization. Slurry polymerization and bulk polymerization may be possible. However, since the subsequent second polymerization step is preferably carried out in a vapor phase, the first step is preferably vapor phase polymerization as well. Slurry polymerization or bulk polymerization when employed in the second polymerization step could cause the resulting copolymer to elute in the solution, rendering a continuous stable operation difficult. Thus, it is not acceptable.

Polymerization conditions for the crystalline polypropylene segment in the first polymerization step may be varied depending on a polymerization mode employed. In a vapor phase polymerization method, propylene and, if necessary, α-olefin other than propylene are fed to be polymerized into crystalline polypropylene segment by controlling the polymerization temperature to 20–120° C., preferably 40–100° C. and the polymerization pressure to atmospheric pressure to 9.9 MPa, preferably 0.59–5.0 MPa in the presence of a stereoregular catalyst containing a preactivated titanium-containing catalyst and the like, while mixing and stirring them in a polymerization vessel using a fixed amount of polypropylene powders as a dispersant.

In this case, the organic aluminum compound(B) and the titanium-containing solid catalyst(A) is used in a proportion of Al/Ti=1–500 (molar ratio), preferably 10–30. The number of moles for the titanium-containing solid catalyst component(A) substantially corresponds to the number of grams for Ti in the catalyst component(A).

Usually, the organic aluminum compound(B) and the organic silicon compound(C) is used in a proportion of B/C=1–10 (molar ratio), preferably 1.5–8.

A molar ratio B/C exceeding 10 will possibly reduce crystallinity of the crystalline polypropylene, rendering the rigidity of the resulting block copolymer component unsatisfactory. On the other hand, a molar ratio B/C less than 1 will cause possible reduction in the polymerization activity, and hence reduction in the productivity. Accordingly, it is not preferred.

A molecular weight modifier such as hydrogen can be used to control the molecular weight of the crystalline polypropylene segment during the polymerization. This should be done so as to satisfy the aforementioned prescribed range of intrinsic viscosity of the crystalline polypropylene segment of the present invention.

Once the crystalline polypropylene was prepared by polymerization, it is advantageous to check with properties of the crystalline polypropylene by drawing a part of the resulting powder to determine the intrinsic viscosity, the MFR, the amount of the xylene-soluble component at 20° C., the isotactic pentad fraction (P) and the polymerization yield per unit weight of the catalyst.

Subsequent to the first polymerization step described above, the second polymerization step is carried out to form the propylene/α-olefin copolymer segment. In this second step, polymerization temperature is controlled to 20–120° C., preferably 40–100° C. and the polymerization pressure to atmospheric pressure to 9.9 MPa, preferably 0.59–5.0 MPa. Mixed monomer of α-olefin s, for example, ethylene and propylene, are copolymerized under such conditions.

Ethylene unit content in the resulting copolymer can be adjusted by controlling a gas molar ratio of an ethylene monomer to a propylene monomer contained in the comonomer gas, and it is preferably set at 22–55% by weight.

Controlling the polymerization time and using a polymerization activity-controlling agent for a catalyst such as carbon monooxide and hydrogen sulfide can control the weight of the copolymer segment to the weight of the crystalline polypropylene segment. In the present invention, it is preferable to adjust the weight of the copolymer segment to 22 to 60% by weight.

Further, the intrinsic viscosity of the copolymer segment can be controlled to the prescribed range according to the present invention by adding a molecular weight modifier such as hydrogen during the copolymerization step. Hydrogen is fed so that the Q value (Mw/Mn) of the resulting block copolymer component may fall in the prescribed range according to the invention.

Mode of the polymerization may be any of a batch, semi-continuous and continuous systems, and a continuous polymerization is advantageously employed from an industrial viewpoint.

Upon completion of the second polymerization step described above, the monomers are removed from the polymerization system, thereby obtaining a particulate polymer which is the propylene block copolymer component.

The particulate polymer is subjected to measurement of intrinsic viscosity, an amount of a xylene-soluble component at 20° C., Q value and an ethylene content and measurement of a polymerization yield per unit weight of the catalyst and can be utilized for the quality control of the present propylene composition.

The synthetic olefin rubbers described above, particularly the ethylene copolymer rubbers, are available from the market: EPM includes "Tufmer" P0180 (trade name: manufactured by Mitsui Chemical Ind. Co., Ltd.), JSR EP912P (trade name: manufactured by JSR Corporation) and the like.

EPDM includes JSR EP133 (trade name: manufactured by JSR Corporation) and the like.

The ethylene/butene copolymer rubbers include 2041P (trade name: manufactured by JSR Corporation), Tufmer A4085 (trade name: manufactured by Mitsui Chemical Ind. Co., Ltd.) and the like.

The ethylene/octene copolymer rubbers include ENGAGE EG8411 (trade name: manufactured by Dow Chemical Co., Ltd.) and the like.

The hydrogenated butadiene block copolymer rubbers include DYNARON 6200P (trade name: manufactured by JSR Corporation) and the like.

The synthetic styrene rubbers are also available from the market: the styrene-butadiene-styrene copolymer includes "KRAYTON D" D-1155 (trade name: manufactured by Shell Japan Co., Ltd.) and the like.

The styrene-isoprene-styrene copolymer includes "KRAYTON D" D-1113 (trade name: manufactured by Shell Japan Co., Ltd.) and the like.

The styrene-ethylene/butylene-styrene copolymer includes "KRAYTON G" G-1650 (trade name: manufactured by Shell Japan Co., Ltd.), "TUFTEC" H1041 (trade name: manufactured by Asahi Chemicals Ind. Co., Ltd.) and the like.

The styrene-ethylene/propylene-styrene copolymer includes "SEPTON" KL2007 (trade name: manufactured by Kuraray Co., Ltd.), "KRAYTON G" GRP6621 (trade name: manufactured by Shell Japan Co., Ltd.) and the like.

The triblock copolymer in which polystyrene is combined with vinyl-polyisoprene includes "HYBRAR" VS-1 (trade name: manufactured by Kuraray Co., Ltd.) and the like.

The hydrogenated styrene-butadiene rubbers include "DYNARON" 1320P (trade name: manufactured by JSR Corporation) and the like.

The styrene-ethylene/butylene-olefin crystal block copolymers include "DYNARON" 4600P (trade name: manufactured by JSR Corporation) and the like.

The propylene block copolymer component obtained as above, the rubber component and, if necessary, various additives such as a heat stabilizer, a neutralizing agent and the like are mixed while stirring, and the mixture is further melt-kneaded to obtain the polypropylene composition of the present invention.

Stirring and mixing can be carried out by means of various types of stirring mixers such as Henschel mixer, and melting and kneading can be carried out by means of various types of extruders. The polypropylene composition produced according to the present invention is usually in the form of pellets.

The present polypropylene composition thus obtained is utilized as a raw material for various shapes of molded articles by means of various molding methods including injection molding and extrusion molding.

In molding, various known additives in the art such as an antioxidant, a neutralizing agent, an antistatic agent, a weathering agent and the like can be added to the present composition, if necessary.

The polypropylene composition of the present invention exerts excellent characteristics, particularly good emboss transferring property, of which fully detailed explanation is not available, but the present inventors presently infer as follows.

That is, in the present composition, the flowability of the specific propylene block copolymer component as a base polymer and that of the synthetic olefin rubber component and/or the synthetic styrene rubber component are controlled. And such flowability control enables to maintain uniform flowability to a finely embossed surface, resulting in improved emboss transferring property.

EXAMPLES

The present invention shall be explained below in further details with reference to examples and comparative examples, but the present invention shall not be restricted to these examples. Molded articles obtained in the respective examples were evaluated for the following property.

Emboss Transferring Property

The polypropylene composition of each example was injection-molded at a set temperature of 230° C. to prepare surface-embossed molded articles of 95 mm×95 mm×2.5 mm (length×width×thickness). Similarly, injection-molding was conducted at a set temperature of 230° C. to prepare a molded article with a specular surface of 50 mm×50 mm×2 mm (length×width×thickness). The surface gloss of the respective molded articles thus obtained were measured at an indicated angle of 60° by means of a digital glossimeter GM-3D manufactured by Murakami Color Technology Laboratory according to ASTM D523.

The gloss of the molded articles with a specular surface was designated as specular gloss, and the gloss of the molded articles with embossing was designated as emboss gloss. In the evaluation, the emboss transferring property was judged excellent when the specular gloss was 70 or more and the emboss gloss was 2 or less.

The propylene block copolymer components ("PP-1", "PP-2", "PP-4" and "PP-5" shown in Tables 1 to 4 described later) used in the following examples and comparative examples were produced by the processes shown below.

1) Preparation of Titanium-containing Solid Catalyst Component a) Titanium-containing solid catalyst component (I)

A nitrogen purged SUS-autoclave was charged with 95.3 g of anhydrous $MgCl_2$ and 352 ml of dried EtOH, and the mixture was heated at 105° C. while stirring and dissolved. After stirring for one hour, this solution was inserted into a fluid spray nozzle with pressurized nitrogen heated at 105° C. (1.1 MPa). Flow rate of nitrogen gas was set to 38 L/min, and cooling liquefied nitrogen was introduced into a spray tower to maintain the temperature inside the tower at −15° C.

The resulting substance was collected in cooled hexane which had been introduced into the bottom of the tower to obtain 256 g of the product. Analysis of this product revealed that the composition was $MgCl_2.6EtOH$, which was the same as that of the starting solution.

The product thus obtained was sieved to obtain 205 g of a spherical carrier having a particle diameter of 45–212 μm. The resulting carrier was dried at room temperature for 181 hours while introducing nitrogen at a flow rate of 3 L/min to obtain a dry carrier, whose composition was $MgCl_2.1.7EtOH$.

A glass flask was charged with 20 g of the dry carrier, 160 ml of titanium tetrachloride and 240 ml of purified 1,2-dichloroethane, and they were mixed and heated at 100° C. while stirring. Then, 6.8 ml of diisobutyl phthalate was added. After stirring at 100° C. for 2 hours, the liquid phase was removed by decantation. Added again were 160 ml of titanium tetrachloride and 320 ml of purified 1,2-dichloroethane. After heating at 100° C. for one hour while maintaining the temperature, the mixture was washed with purified hexane and dried to afford a titanium-containing solid catalyst component I-1.

The resulting titanium-containing solid catalyst component (I) had an average particle diameter of 115 μm, and the analytical values thereof were: Mg, 19.5%; Ti, 1.6%; Cl, 59.0%; and diisobutyl phthalate, 4.5% (all % by weight).

2) Preactivation Treatment of the Titanium-containing Solid Catalyst Component (I)

Into a 15-L SUS reactor equipped with inclined blades which had been purged with nitrogen were introduced at a room temperature 8.3 L of a saturated hydrocarbon solvent (CRYSTOL-52 manufactured by Esso Petroleum Co., Ltd.) with a kinetic viscosity at 40° C. of 7.3 cSt, 525 mmol of triethylaluminum, 80 mmol of diisopropyldimethoxysilane and 700 g of the titanium-containing solid catalyst component as prepared above and heated to 40° C. Then, the preactivation treatment was conducted by reacting at a partial propylene pressure of 0.15 MPa for 7 hours. Results of analysis showed that the reacted propylene was 3.0 g per one gram of the titanium-containing solid catalyst component.

3) First Polymerization Step

As illustrated in FIG. 1, into a horizontal type polymerization vessel 1 (L/D=6, volume: 100 L) with agitating blades was continuously fed with 0.5 g/hr of the preactivated titanium-containing solid catalyst component, triethylaluminum as an organic aluminum compound (II) and diisopropyldimethoxysilane as an organic silicon compound (III). Then, propylene was continuously fed so as to. maintain the reaction conditions, i.e., a temperature at 70° C., a pressure at 2.5 MPa and a rate of stirring at 40 rpm. Further, hydrogen gas was continuously fed from the circulating pipeline 2 to control the molecular weight of the crystalline polypropylene component, and the intrinsic viscosity of the resulting polymer was controlled by adjusting the hydrogen level in the vapor phase in the reactor.

The heat of reaction was removed by utilizing the heat of vaporization of the raw material liquefied propylene which was fed from the pipeline 3. Further, unreacted gas discharged from the polymerization vessel was cooled and condensed through the pipeline 4 outside the reactor system and circulated into the vessel 1.

The crystalline polypropylene segment produced in the polymerization vessel was continuously drawn out of the vessel 1 through the pipeline 5 so as to keep the polymer content in the reactor at 50% v/v and fed into the polymerization vessel 10 in the second polymerization step. A part of the crystalline polypropylene segment intermittently drawn out from the pipeline 5 was used as a sample for determining the intrinsic viscosity and the yield of the polymer per unit weight of the catalyst. The yield of the polymer per unit weight of the catalyst was calculated from the Mg content in the polymer determined by high-frequency induction coupling plasma emission spectral analysis (ICP method).

4) Second Polymerization Step

Into a horizontal type polymerization vessel 10 (L/D=6, volume: 100 L) with agitating blades was continuously fed the crystalline polypropylene segment from the first polymerization step and ethylene gas through the pipeline 7 for introducing an activity-inhibitor and liquefied propylene through the pipeline 6 for a raw material propylene, respectively. Then, the ethylene unit content in the copolymer segment was controlled under the conditions, i.e., a rate of stirring at 40 rpm, a temperature at 60° C., a pressure at 2.1 MPa and a molar ratio of ethylene/propylene in a vapor phase. Carbon monooxide which was a polymerization activity-inhibitor was fed from the pipeline 7 to control the polymerized amount of the copolymer segment. Further, hydrogen was similarly fed from the pipeline 7 to control the molecular weight of the copolymer segment.

The heat of reaction was removed by utilizing the heat of vaporization of the raw material liquefied propylene which was fed from the pipeline 6. Unreacted gas discharged from the polymerization vessel was cooled and condensed through the pipeline 8 outside the reactor system and circulated into this copolymerization step. The propylene block copolymer formed in the copolymerization step was drawn out of the polymerization vessel 10 through the pipeline 9 so as to provide the polymer content in the reactor of 50% v/v.

The production rate of the propylene block copolymer component was 8–12 kg/hr. After removing unreacted monomers from the reaction mixture, the propylene block copolymer component was subjected to measurement of intrinsic viscosity and yield of the polymer per unit weight of the catalyst as well as ethylene unit content in the copolymer component by infrared rays.

Powdery propylene block copolymer components, PP-1, PP-2, PP-4 and PP-5 shown in Tables 1 to 4 were obtained according to the procedures described above.

The intrinsic viscosity $[\eta]_{RC}$ of the ethylene/propylene copolymer segment in this block copolymer component, the intrinsic viscosity ratio of the copolymer segment to the crystalline polypropylene segment $[\eta]_{RC}/[\eta]_{PP}$ and the product of the above ratio $([\eta]_{RC}/[\eta]_{PP}) \times (W_{PP}/W_{RC})$ and the weight ratio $W_{PP}/W_{RC}$ were shown in Tables 1 to 4.

Further, PP-3 which was the propylene block copolymer component used in the respective examples and comparative examples in Tables 1 to 4 was produced by the process described below.

That is, the titanium-containing solid catalyst component (I) used for PP-1, PP-2, PP-4 and PP-5 was subjected to the same preactivation treatment. The preactivated catalyst component was used to obtain a powder PP-3 through the first and second polymerization steps. The first and second polymerization steps shall be described below.

1) First Polymerization Step

As illustrated in FIG. 1, into a horizontal type polymerization vessel 1 (L/D=6, volume: 100 L) with agitating blades was continuously fed with 0.5 g/hr of the preactivated titanium-containing solid catalyst component, triethylaluminum as an organic aluminum compound (II) and diisopropyldimethoxysilane as an organic silicon compound (III). Then, liquefied propylene and ethylene gas were continuously fed from the raw material propylene pipeline 3 and the circulation pipeline 2, respectively, so as to maintain the reaction conditions of the temperature at 65° C., the pressure at 2.2 MPa and the rate of stirring at 40 rpm. Copolymerization of ethylene with propylene was conducted with adjusting the ethylene unit content in the crystalline polypropylene segment by molar ratio of ethylene/propylene in the vapor phase. Further, hydrogen gas was continuously fed from the circulating pipeline 2 to control the molecular weight of the propylene/ethylene copolymer component, and the intrinsic viscosity of the resulting polymer was controlled by adjusting the hydrogen level in the vapor phase in the reactor.

The heat of reaction was removed by vaporization heat of the raw material liquefied propylene which was fed from the pipeline 3. Unreacted gas discharged from the polymerization vessel was cooled and condensed through the pipeline 4 outside the reactor system and circulated into the vessel 1.

The crystalline polypropylene segment produced in the polymerization vessel, i.e., propylene/ethylene random copolymer which was a propylene/αα-olefin random copolymer, was continuously drawn out of the vessel 1 through the pipeline 5 so as to keep the polymer content in the reactor at 50% v/v and fed into the polymerization vessel 10 in the second polymerization step.

A part of the crystalline polypropylene segment intermittently drawn out from the pipeline 5 was used as a sample for determining the ethylene content, the intrinsic viscosity and the yield of the polymer per unit weight of the catalyst.

2) Second Polymerization Step

Into a horizontal type polymerization vessel 10 (L/D=6, volume: 100 L) with agitating blades was continuously fed the propylene/α-olefin random copolymer from the first polymerization step and ethylene gas through the pipeline 7 for introducing an activity-inhibitor and liquefied propylene through the pipeline 6 for a raw material propylene, respectively. Then, the ethylene unit content in the copolymer segment was controlled under the conditions of rate of stirring at 40 rpm, temperature at 60° C., pressure at 2.2 MPa and the molar ratio of ethylene/propylene in a vapor phase. Carbon monooxide which was a polymerization activity-inhibitor was fed from the pipeline 7 to control the polymerized amount of the copolymer segment. Further, hydrogen was similarly fed from the pipeline 7 to control the molecular weight of the copolymer segment.

The heat of reaction was removed by vaporization heat of the raw material liquefied propylene which was fed from the pipeline 6. Unreacted gas discharged from the polymerization vessel was cooled and condensed through the pipeline 8 outside the reactor system and circulated into this copolymerization step. The propylene block copolymer formed in the copolymerization step was drawn out of the polymerization vessel 10 through the pipeline 9 so as to provide the polymer content in the reactor of 50% v/v.

The production rate of the propylene block copolymer component was 8–12 kg/hr. Unreacted monomers were removed from the reaction mixture. A part of the propylene block copolymer component was subjected to measurement of ethylene unit content, intrinsic viscosity and yield of the polymer per unit weight of the catalyst.

Powdery propylene block copolymer component PP-3 shown in Tables 1 to 4 was obtained according to the procedures described above.

The intrinsic viscosity $[\eta]_{RC}$ of the ethylene/propylene copolymer segment in this block copolymer component, the intrinsic viscosity ratio of the copolymer segment to the crystalline polypropylene segment $[\eta]_{RC}/[\eta]_{PP}$ and the product of the intrinsic viscosity ratio $[\eta]_{RC}/[\eta]_{PP}$ and the weight ratio $W_{PP}/W_{RC}$, $([\eta]_{RC}/[\eta]_{PP}) \times (W_{PP}/W_{RC})$ were shown in Tables 1 to 4.

RC amounts shown in the Tables 1 to 4 below mean the weight percentages of the propylene/α-olefin random copolymer segment, when that of the propylene block copolymer component was taken as 100% by weight. In addition, RC-C$_2$ amounts in the tables mean the weight percentages of the ethylene weight units contained in the propylene/α-olefin random copolymer segment in the propylene block copolymer component, when that of the whole propylene/α-olefin random copolymer was taken as 100% by weight. Further, PP-C$_2$ amounts in the tables mean the weight percentages of the ethylene weight units contained in the crystalline polypropylene segments, when that of the crystalline polypropylene segment contained in the propylene block copolymer component was taken as 100% by weight.

The following synthetic rubber components were used in the examples and comparative examples in Tables 1 to 4.

R-1: ethylene/propylene copolymer rubber having an ethylene content of 74% by weight and a melt flow rate (230° C., 21.18N) of 3.1 g/10 minutes.

R-2: ethylene/octene copolymer rubber having an ethylene content of 76% by weight and a melt flow rate (230° C., 21.18N) of 10 g/10 minutes.

R-3: ethylene/propylene copolymer rubber having an ethylene content of 78% by weight and a melt flow rate (230° C., 21.18N) of 8 g/10 minutes.

R-4: hydrogenated butadiene block polymer rubber having a melt flow rate (230° C. 21.18N) of 2.5g/10 minutes.

R-5: ethylene/propylene copolymer rubber having an ethylene content of 54% by weight and a melt flow rate (230° C., 21.18N) of 0.9 g/10 minutes.

R-6: ethylene/butylene copolymer rubber having an ethylene content of 80% by weight and a melt flow rate (230° C., 21.18N) of 3.5 g/10 minutes.

R-7: ethylene/octene copolymer rubber having an ethylene content of 76% a by weight and a melt flow rate (230° C., 21.18N) of 1 g/10 minutes.

R-8: ethylene/octene copolymer rubber having an ethylene content of 80% by weight and a melt flow rate (230° C., 21.18N) of 20 g/10 minutes.

R-9: ethylene/propylene copolymer rubber having an ethylene content of 78% by weight and a melt flow rate (230° C., 21.18N) of 40 g/10 minutes.

R-10 ethylene/propylene/diene copolymer rubber having an ethylene content of 72% by weight and a propylene content of 28% by weight, using ethylidenenorbornene as the diene and having an iodine value of 15.0 and a melt flow rate (230° C., 21.18N) of 0.4 g/10 minutes.

R-11: styrene elastomer with a constitution of styrene-ethylene/butylene-styrene having a styrene content of 30% by weight and a melt flow rate (230° C., 21.18N) of 5.0 g/10 minutes.

R-12: styrene elastomer with a constitution of styrene-ethylene/propylene-styrene having a styrene content of 30% by weight and a melt flow rate (230° C., 21.18N) of 2.4 g/10 minutes.

R-13: styrene elastomer with a constitution of styrene-ethylene/propylene-styrene having a styrene content of 30% by weight and a melt flow rate (230° C., 21.18N) of 0.05 g/10 minutes.

R-14: hydrogenated styrene-butadiene rubber having a styrene content of 10% by weight and a melt flow rate (230° C., 21.18N) of 3.5 g/10 minutes.

The melt flow rates $[MFR]_{TR}$ in the respective examples and comparative examples in which plural rubber components shown in Tables 2, 3 and 4 were blended were calculated from the following equation:

$$\log[MFR]_{TR} = \Sigma[Wi \log[MFR]_{Ri}]$$

wherein Wi represents a blending proportion of the blended rubber i; $[MFR]_{Ri}$ represents a melt flow rate of the blended rubber i; and i represents an integer.

Examples 1 to 18 and Comparative Examples 1 to 9

As shown in Tables 1, 2 and 3, the propylene block copolymer component powders (PP-1, PP-2, PP-3, PP-4 and PP-5) and the synthetic olefin rubber components (R-1, R-2, R-3, R-4, R-5, R-6, R-7, R-8, R-9 and R-10) were blended to obtain respective compositions. Further, put into a high-speed stirrer were 1,3-bis(t-butylperoxyisopropyl)benzene as a molecular weight-reducing agent in the amounts indicated in Tables 1 to 3, 0.1 part by weight of 2,6-di-t-butyl-p-cresol as a phenolic heat stabilizer and 0.1 part by weight of calcium stearate as a neutralizing agent each per 100 parts by weight of the above composition, and they were stirred for 3 minutes to obtain mixtures.

Then, these mixtures were melt-kneaded at 200° C. by means of an extruder having an aperture of 45 mm and pelletized to provide the polypropylene compositions of the respective examples. The pellets thus obtained were used to evaluate the emboss transferring property as described above. The results are shown in Tables 1 to 3.

Examples 19 to 22 and Comparative Examples 10 and 11

As shown in Table 4, blended were the propylene block copolymer component powders (PP-2, PP-3 and PP-4), the styrene elastomers (R-11, R-12, R-13 and R-15) and the synthetic olefin rubber (R-5) in Table 4 to obtain respective compositions. Further, put into a high-speed stirrer were 1,3-bis(t-butylperoxyisopropyl)benzene as a molecular weight-reducing agent in the amount indicated in Table 4, 0.1 part by weight of 2,6-di-t-butyl-p-cresol as a phenolic heat stabilizer and 0.1 part by weight of calcium stearate as a neutralizing agent each per 100 parts by weight of the above composition, and they were stirred for 3 minutes to obtain mixtures.

Then, these mixtures were melt-kneaded at 200° C. by means of an extruder having an aperture of 45 mm and pelletized to provide the polypropylene compositions of the respective examples. The pellets thus obtained were used to evaluate the emboss transferring property as described above. The results are shown in Table 4.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Blend composition of compositions | | | | | | | | | | | | |
| PP-1 (wt %) | 80 | 80 | 72 | 46 | 72 | 72 | 62 | | | | | |
| PP-2 (wt %) | | | | | | | | 62 | 62 | | | |
| PP-3 (wt %) | | | | | | | | | | 62 | 54 | 54 |
| R-1 (wt %) | 20 | 20 | 28 | 54 | | | | | | | | |
| R-2 (wt %) | | | | | 28 | 28 | 38 | 38 | 38 | 38 | 46 | 46 |
| R-3 (wt %) | | | | | | | | | | | | |
| R-4 (wt %) | | | | | | | | | | | | |
| R-5 (wt %) | | | | | | | | | | | | |
| R-6 (wt %) | | | | | | | | | | | | |

TABLE 1-continued

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Molecular weight-reducing agent | | 0.07 | 0.07 | | | 0.07 | 0.08 | | 0.03 | 0.03 | | 0.03 |
| Propylene block copolymer | PP-1 | PP-1 | PP-1 | PP-1 | PP-1 | PP-1 | PP-1 | PP-2 | PP-2 | PP-3 | PP-3 | PP-3 |
| Blending amount (wt %) | 80 | 80 | 72 | 46 | 72 | 72 | 62 | 62 | 62 | 62 | 54 | 54 |
| $[\eta]_{PP}$ | 3.4 | 3.4 | 3.4 | 3.4 | 3.4 | 3.4 | 3.4 | 2 | 2 | 2.05 | 2.05 | 2.05 |
| $[\eta]_{RC}$ | 2.2 | 2.2 | 2.2 | 2.2 | 2.2 | 2.2 | 2.2 | 2 | 2 | 2.05 | 2.05 | 2.05 |
| $[\eta]_{RC}/[\eta]_{PP}$ | 0.65 | 0.65 | 0.65 | 0.65 | 0.65 | 0.65 | 0.65 | 1 | 1 | 1 | 1 | 1 |
| $W_{PP}/W_{RC}$ | 2.03 | 2.03 | 2.03 | 2.03 | 2.03 | 2.03 | 2.03 | 2.03 | 2.03 | 4 | 4 | 4 |
| $([\eta]_{RC}/[\eta]_{PP}) \times (W_{PP}/W_{RC})$ | 1.32 | 1.32 | 1.32 | 1.32 | 1.32 | 1.32 | 1.32 | 2.03 | 2.03 | 4 | 4 | 4 |
| $[MFR]_{PP}$ | 0.35 | 0.35 | 0.35 | 0.35 | 0.35 | 0.35 | 0.35 | 3 | 3 | 2.5 | 2.5 | 2.5 |
| PP-$C_2$ amount (wt %) | 0 | 0 | 0 | 0 | 0 | 0 | 0 | 0 | 0 | 3 | 3 | 3 |
| RC amount (wt %) | 33 | 33 | 33 | 33 | 33 | 33 | 33 | 33 | 33 | 20 | 20 | 20 |
| RC-$C_2$ amount (wt %) | 36 | 36 | 36 | 36 | 36 | 36 | 36 | 36 | 36 | 25 | 25 | 25 |
| Synthetic rubber 1 | R-1 | R-1 | R-1 | R-1 | R-2 | R-2 | R-2 | R-2 | R-2 | R-2 | R-2 | R-2 |
| Blending amount (wt %) | 20 | 20 | 28 | 54 | 28 | 28 | 38 | 38 | 38 | 38 | 46 | 46 |
| $[MFR]_{R1}$ | 3.1 | 3.1 | 3.1 | 3.1 | 10 | 10 | 10 | 10 | 10 | 10 | 10 | 10 |
| $[MFR]_{TR}$ | 3.1 | 3.1 | 3.1 | 3.1 | 10 | 10 | 10 | 10 | 10 | 10 | 10 | 10 |
| $[MFR]_{TR}/[MFR]_{PP}$ | 8.86 | 8.86 | 8.86 | 8.86 | 28.6 | 28.6 | 28.6 | 3.33 | 3.33 | 4 | 4 | 4 |
| Emboss molded article gloss (%) | 1.4 | 1.3 | 1.8 | 2.0 | 1.7 | 1.6 | 1.7 | 1.6 | 1.5 | 1.2 | 1.4 | 1.4 |
| Specular molded article gloss (%) | 84 | 85 | 84 | 75 | 80 | 82 | 83 | 85 | 86 | 86 | 81 | 84 |

TABLE 2

| | Example | | | | | |
|---|---|---|---|---|---|---|
| | 13 | 14 | 15 | 16 | 17 | 18 |
| Blend composition of compositions | | | | | | |
| PP-1 (wt %) | | | | | | |
| PP-2 (wt %) | | | | | | |
| PP-3 (wt %) | 54 | 54 | 60 | 60 | 60 | 60 |
| R-1 (wt %) | | | | | | |
| R-2 (wt %) | 38 | 38 | | | | 17 |
| R-3 (wt %) | 8 | 8 | | | | 6 |
| R-4 (wt %) | | | 5 | 5 | 5 | 5 |
| R-5 (wt %) | | | 35 | 9 | 9 | 3 |
| R-6 (wt %) | | | | 26 | 26 | 9 |
| Molecular weight-reducing agent (PHR) | | 0.03 | 0.12 | | 0.12 | 0.07 |
| Propylene block copolymer | PP-3 | PP-3 | PP-3 | PP-3 | PP-3 | PP-3 |
| Blending amount (wt %) | 54 | 54 | 60 | 60 | 60 | 60 |
| $[\eta]_{PP}$ | 2.05 | 2.05 | 2.05 | 2.05 | 2.05 | 2.05 |
| $[\eta]_{RC}$ | 2.05 | 2.05 | 2.05 | 2.05 | 2.05 | 2.05 |
| $[\eta]_{RC}/[\eta]_{PP}$ | 1 | 1 | 1 | 1 | 1 | 1 |
| $W_{PP}/W_{RC}$ | 4 | 4 | 4 | 4 | 4 | 4 |
| $([\eta]_{RC}/[\eta]_{PP}) \times (W_{PP}/W_{RC})$ | 4 | 4 | 4 | 4 | 4 | 4 |
| $[MFR]_{PP}$ | 2.5 | 2.5 | 2.5 | 2.5 | 2.5 | 2.5 |
| PP-$C_2$ amount (wt %) | 3 | 3 | 3 | 3 | 3 | 3 |
| RC amount (wt %) | 20 | 20 | 20 | 20 | 20 | 20 |
| RC-$C_2$ amount (wt %) | 25 | 25 | 25 | 25 | 25 | 25 |
| Synthetic rubber 1 | R-2 | R-2 | R-5 | R-6 | R-6 | R-2 |
| Blending amount (wt %) | 38 | 38 | 35 | 26 | 26 | 17 |
| $[MFR]_{R1}$ | 10 | 10 | 0.9 | 2.5 | 2.5 | 10 |
| Synthetic rubber 2 | R-3 | R-3 | R-4 | R-5 | R-5 | R-3 |
| Blending amount (wt %) | 8 | 8 | 5 | 9 | 9 | 6 |
| $[MFR]_{R2}$ | 8 | 8 | 2.5 | 0.9 | 0.9 | 8 |
| Synthetic rubber 3 | | | | R-4 | R-4 | R-4 |
| Blending amount (wt %) | | | | 5 | 5 | 5 |
| $[MFR]_{R3}$ | | | | 2.5 | 2.5 | 2.5 |
| Synthetic rubber 4 | | | | | | R-5 |
| Blending amount (wt %) | | | | | | 3 |
| $[MFR]_{R4}$ | | | | | | 0.9 |
| Synthetic rubber 5 | | | | | | R-6 |
| Blending amount (wt %) | | | | | | 9 |
| $[MFR]_{R5}$ | | | | | | 2.5 |
| $[MFR]_{TR}$ | 9.77 | 9.77 | 1.02 | 2 | 2 | 5.13 |
| $[MFR]_{TR}/[MFR]_{PP}$ | 3.91 | 3.91 | 0.408 | 0.8 | 0.8 | 2.05 |
| Emboss molded article gloss (%) | 1.3 | 1.5 | 1.7 | 1.7 | 1.8 | 1.3 |
| Specular molded article gloss (%) | 82 | 84 | 77 | 76 | 78 | 84 |

TABLE 3

| | Comparative Example | | | | | | | | |
|---|---|---|---|---|---|---|---|---|---|
| | 1 | 2 | 3 | 4 | 5 | 6 | 7 | 8 | 9 |
| Blend composition of compositions | | | | | | | | | |
| PP-1 (wt %) | | | | | | | | 80 | |
| PP-2 (wt %) | | 60 | | | | | | | |
| PP-3 (wt %) | | | 60 | | | | | | 62 |
| PP-4 (wt %) | | | | 66 | | 66 | 66 | | |
| PP-5 (wt %) | | | | | 73 | | | | |
| R-1 (wt %) | | | | | | | | | |
| R-2 (wt %) | | | | 22 | 18 | | | | |

TABLE 3-continued

|  | Comparative Example | | | | | | | | |
|---|---|---|---|---|---|---|---|---|---|
|  | 1 | 2 | 3 | 4 | 5 | 6 | 7 | 8 | 9 |
| R-3 (wt %) |  |  | 8 | 6 |  |  |  |  |  |
| R-4 (wt %) |  |  | 4 | 3 | 4 | 4 | 4 |  |  |
| R-5 (wt %) |  |  |  |  | 10 |  |  |  |  |
| R-6 (wt %) |  |  |  |  |  |  |  |  |  |
| R-7 (wt %) |  |  |  |  | 20 |  |  |  |  |
| R-8 (wt %) |  |  |  |  |  | 20 | 10 |  |  |
| R-9 (wt %) |  |  |  |  |  | 10 | 20 |  |  |
| R-10 (wt %) | 40 | 40 |  |  |  |  |  | 20 | 38 |
| Molecular weight-reducing agent (PHR) |  |  |  | 0.01 | 0.01 |  |  | 0.15 | 0.15 |
| Propylene block copolymer | PP-2 | PP-3 | PP-4 | PP-5 | PP-4 | PP-4 | PP-4 | PP-1 | PP-3 |
| Blending amount (wt %) | 62 | 62 | 66 | 73 | 66 | 66 | 64 | 80 | 62 |
| $[\eta]_{PP}$ | 2 | 2.05 | 1 | 1 | 1 | 1 | 1 | 3.4 | 2.05 |
| $[\eta]_{RC}$ | 2 | 2.05 | 2.6 | 2.7 | 2.6 | 2.6 | 2.6 | 2.2 | 2.05 |
| $[\eta]_{RC}/[\eta]_{PP}$ | 1 | 1 | 2.6 | 2.7 | 2.6 | 2.6 | 2.6 | 0.65 | 1 |
| $W_{PP}/W_{RC}$ | 2.03 | 4 | 2.6 | 1.7 | 2.6 | 2.6 | 2.6 | 2.03 | 4 |
| $([\eta]_{RC}/[\eta]_{PP}) \times (W_{PP}/W_{RC})$ | 2.03 | 4 | 7.03 | 4.6 | 6.76 | 6.76 | 6.76 | 1.32 | 4 |
| $[MFR]_{PP}$ | 3 | 2.5 | 97 | 43 | 97 | 97 | 97 | 0.35 | 2.5 |
| PP-$C_2$ amount (wt %) | 0 | 3 | 0 | 0 | 0 | 0 | 0 | 0 | 3 |
| RC amount (wt %) | 33 | 20 | 28 | 37 | 28 | 28 | 28 | 33 | 20 |
| RC-$C_2$ amount (wt %) | 36 | 25 | 45 | 41 | 45 | 45 | 45 | 36 | 25 |
| Synthetic rubber 1 | R-10 | R-10 | R-2 | R-2 | R-5 | R-8 | R-8 | R-10 | R-10 |
| Blending amount (wt %) | 20 | 20 | 22 | 18 | 10 | 20 | 10 | 20 | 38 |
| $[MFR]_{R1}$ | 0.4 | 0.4 | 10 | 10 | 0.9 | 20 | 20 | 0.4 | 0.4 |
| Synthetic rubber 2 |  |  | R-3 | R-3 | R-7 | R-9 | R-9 |  |  |
| Blending amount (wt %) |  |  | 8 | 6 | 20 | 10 | 20 |  |  |
| $[MFR]_{R2}$ |  |  | 8 | 8 | 1 | 40 | 40 |  |  |
| Synthetic rubber 3 |  |  | R-4 | R-4 | R-4 | R-4 | R-4 |  |  |
| Blending amount (wt %) |  |  | 4 | 3 | 4 | 4 | 4 |  |  |
| $[MFR]_{R3}$ |  |  | 2.5 | 2.5 | 2.5 | 2.5 | 2.5 |  |  |
| $[MFR]_{TR}$ | 0.4 | 0.4 | 8.13 | 8.13 | 1.1 | 1.95 | 23.44 | 0.4 or less | 0.4 or less |
| $[MFR]_{TR}/[MFR]_{PP}$ | 0.13 | 0.16 | 0.08 | 0.19 | 0.01 | 0.2 | 0.24 | 1.14 or less | 0.16 or less |
| Emboss molded article gloss (%) | 2.2 | 2.1 | 2.3 | 2.1 | 2.3 | 2.3 | 2.3 | 2.5 | 2.5 |
| Specular molded article gloss (%) | 77 | 78 | 83 | 82 | 79 | 84 | 85 | 65 | 67 |

TABLE 4

|  | Example | | | | Comparative Example | |
|---|---|---|---|---|---|---|
|  | 19 | 20 | 21 | 22 | 10 | 11 |
| Blend composition of compositions |  |  |  |  |  |  |
| PP-2 (wt %) | 60 | 60 |  | 60 | 60 |  |
| PP-3 (wt %) |  |  | 60 |  |  |  |
| PP-4 (wt %) |  |  |  |  |  | 60 |
| R-5 (wt %) |  | 20 |  |  |  |  |
| R-11 (wt %) |  |  |  | 40 |  |  |
| R-12 (wt %) | 40 |  | 40 |  |  | 40 |
| R-13 (wt %) |  |  |  |  | 40 |  |
| R-14 (wt %) |  | 20 |  |  |  |  |
| Molecular weight-reducing agent (PHR) |  |  |  | 0.12 |  |  |
| Propylene block copolymer | PP-2 | PP-2 | PP-3 | PP-2 | PP-2 | PP-4 |
| Blending amount (wt %) | 60 | 60 | 60 | 60 | 60 | 60 |
| $[\eta]_{PP}$ | 2 | 2 | 2.05 | 2 | 2 | 1 |
| $[\eta]_{RC}$ | 2 | 2 | 2.05 | 2 | 2 | 2.6 |
| $[\eta]_{RC}/[\eta]_{PP}$ | 1 | 1 | 1 | 1 | 1 | 2.6 |
| $W_{PP}/W_{RC}$ | 2.03 | 2.03 | 4 | 2.03 | 2.03 | 2.6 |
| $([\eta]_{RC}/[\eta]_{PP}) \times (W_{PP}/W_{RC})$ | 2.03 | 2.03 | 4 | 2.03 | 2.03 | 6.76 |
| $[MFR]_{PP}$ | 3 | 3 | 2.5 | 3 | 3 | 97 |
| PP-$C_2$ amount (wt %) | 0 | 0 | 3 | 0 | 0 | 0 |
| RC amount (wt %) | 33 | 33 | 20 | 33 | 33 | 28 |
| RC-$C_2$ amount (wt %) | 36 | 36 | 25 | 36 | 36 | 45 |
| Synthetic rubber 1 | R-12 | R-5 | R-12 | R-11 | R-13 | R-12 |
| Blending amount (wt %) | 40 | 20 | 40 | 40 | 40 | 40 |
| $[MFR]_{R1}$ | 2.4 | 0.9 | 2.4 | 5 | 0.05 | 2.4 |
| Synthetic rubber 2 |  | R-14 |  |  |  |  |
| Blending amount (wt %) |  | 20 |  |  |  |  |
| $[MFR]_{R2}$ |  | 3.5 |  |  |  |  |
| $[MFR]_{TR}$ | 2.4 | 1.77 | 2.4 | 5 | 0.05 | 2.4 |
| $[MFR]_{TR}/[MFR]_{PP}$ | 0.8 | 0.59 | 0.96 | 1.67 | 0.02 | 0.02 |
| Emboss molded article gloss (%) | 1.9 | 1.6 | 1.6 | 1.8 | 2.8 | 2.7 |
| Specular molded article gloss (%) | 74 | 79 | 81 | 75 | 63 | 60 |

Table 1 shows that the composition comprising the propylene block copolymer component PP-1, PP-2 or PP-3 in which the intrinsic viscosity $[\eta]_{RC}$ of the copolymer segment in the propylene block copolymer component is 6.5 dl/g or less and the intrinsic viscosity ratio of the copolymer segment to the crystalline polypropylene segment, $[\eta]_{RC}/[\eta]_{PP}$, is 0.5–1.3 and in which the products of the intrinsic viscosity ratio $[\eta]_{RC}/[\eta]_{PP}$ and the weight ratios $W_{PP}/W_{RC}$, $([\eta]_{RC}/[\eta]_{PP})\times(W_{PP}/W_{RC})$, falls in the range of 0.2–4.5; and the olefin rubber component R-1, R-2, R-3, R-4, R-5 or R-6 in which the ratio of the melt flow rate of the rubber component to that of the crystalline polypropylene segment $[MFR]_{TR}/[MFR]_{PP}$ in the above block copolymer component is 0.3–80, can provide specular molded articles with a high gloss and the emboss molded articles with a gloss as low as 2.0 or less. This demonstrates a close adhesion of the compositions to a mold and a high emboss transferring property. In these compositions, the emboss transferring property is found good even if the molecular weight-reducing agent is blended.

On the other hand, Table 2 shows that the present compositions even including plural rubbers can provide a good emboss transferring property as the cases shown in Table 1, if such an olefin rubber component is blended that has the ratio of the melt flow rate of the rubber component to that of the crystalline polypropylene segment $[MFR]_{TR}/[MFR]_{PP}$ in the block copolymer component ranging between 0.3 and 80

Table 3 shows that those compositions in which $[\eta]_{RC}$ of the ethylene propylene copolymer segments is 6.5 dl/g or less and $[\eta]_{RC}/[\eta]_{PP}$ of 0.5–1.3 and the product $([\eta]_{RC}/[\eta]_{PP})\times(W_{PP}/W_{RC})$ is 0.2–4.5, but the ratios $[MFR]_{TR}/[MFR]_{PP}$ in the above block copolymer components are not in the range of 0.3–80, have a high emboss gloss of more than 2, although their specular surface gloss is substantially the same in each example. This demonstrates that those compositions are of poor emboss transferring property.

Also found is that the propylene block copolymers without the aforementioned ranges lead to an inferior emboss transferring property. Further, in Comparative Examples 8 and 9, it may be assumed that the synthetic olefin rubbers used are ethylene/propylene/diene terpolymer rubbers, which are cross-linked by the molecular weight-reducing agent to cause extremely reduced flowability, thereby rendering the ratio $[MFR]_{TR}$ $[MFR]_{PP}$ to fall out of the range of 6.3 to 80. This may cause a deteriorated emboss transferring property.

Furthermore, Table 4 shows that those compositions comprising a synthetic styrene rubber R-11, R-12 or R-14 as a rubber component and a propylene block copolymer component PP-2 or PP-3, have a high emboss transferring property, wherein the intrinsic viscosity $[\eta]_{RC}$ of the propylene block copolymer is 6.5 dl/g or less and the intrinsic viscosity ratio of the copolymer segment to the crystalline polypropylene segment $[\eta]_{RC}/[\eta]_{PP}$ is 0.5–1.3 and the product of the intrinsic viscosity ratio $[\eta]_{RC}/[\eta]_{PP}$ and the weight ratios $W_{PP}/W_{RC}$, $([\eta]_{RC}/[\eta]_{PP}) \times (W_{PP}/W_{RC})$ falls in the range of 0.2–4.5; and the ratio of the melt flow rate of the rubber component to that of the crystalline polypropylene segment, $[MFR]_{TR}/[MFR]_{PP}$, in the above block copolymer component is 0.3–80. Further, combined use of the synthetic olefin rubbers with the synthetic styrene rubbers also provides a high emboss transferring property when values are set in the claimed ranges of the invention.

INDUSTRIAL APPLICABILITY

As described above, according to the present invention, a specific propylene block copolymer component is blended with a rubber component, and the melt flow rate is controlled, if necessary, thereby providing a propylene composition having an excellent emboss transferring property and useful for various skin materials and interior materials at low cost.

What is claimed is:

1. A polypropylene composition having an excellent emboss transferring property, which comprises a propylene block copolymer component containing crystalline polypropylene segment and a propylene/α-olefin copolymer segment, and an olefin synthetic rubber component and/or a styrene synthetic rubber component, wherein the copolymer segment in the block copolymer component has an intrinsic viscosity $[\eta]_{RC}$ up to 6.5 dl/g, and an intrinsic viscosity ratio of this copolymer segment to the crystalline polypropylene segment $[\eta]_{RC}/[\eta]_{PP}$ is 0.5–1.3, the product $([\eta]_{RC}/[\eta]_{PP})\times(W_{PP}/W_{RC})$ of this intrinsic viscosity ratio $([\eta]_{RC}/[\eta]_{PP})$ and a weight ratio thereof $W_{PP}/W_{RC}$ falls in the range of 0.2–4.5 and a ratio of a melt flow rate (230° C., 21.18N) of the rubber component to a melt flow rate (230° C., 21.18N) of the crystalline polypropylene segment in the block copolymer component, $[MFR]_{TR}/[MFR]_{PP}$, is 0.3–80.

2. The polypropylene composition of claim 1, wherein the olefin synthetic rubber component is at least one rubber selected from the group consisting of an ethylene/propylene copolymer rubber, an ethylene/propylene/diene terpolymer rubber, an ethylene/butene copolymer rubber, a hydrogenated butadiene block copolymer rubber and an ethylene/octene copolymer rubber.

3. The polypropylene composition of claim 1, wherein the crystalline polypropylene segment of the propylene block copolymer component has a melt flow rate $[MFR]_{PP}$ of 0.1–50 g/10 minutes (230° C., 21.18N), and the rubber component has a melt flow rate $[MFR]_{TR}$ of 0.1–40 g/10 minutes (230° C., 21.18N).

4. The polypropylene composition of claim 1, which comprises 40–80% by weight of the propylene block copolymer component and 60–20% by weight of the rubber component.

5. The polypropylene composition of claim 1, wherein the crystalline polypropylene segment of the propylene block copolymer component is a propylene homopolymer or a propylene/α-olefin random copolymer having a propylene content of 90–99% by weight based on the weight of the crystalline polypropylene segment.

6. The polypropylene composition of claim 1, wherein a molecular weight-reducing agent of 0.001–0.2 part by weight per 100 parts by weight of the polypropylene composition is added.

7. The polypropylene composition of claim 1, wherein the propylene/α-olefin random copolymer segment of the propylene block copolymer component contains an ethylene weight unit of 20–55% by weight based on the weight of the copolymer segment.

* * * * *